United States Patent [19]

Walters

[11] Patent Number: 4,762,909

[45] Date of Patent: Aug. 9, 1988

[54] METHOD FOR MAKING POLYKETONES

[75] Inventor: Marlin E. Walters, West Columbia, Tex.

[73] Assignee: The Dow Chemical Company, Midland, Mich.

[21] Appl. No.: 99,946

[22] Filed: Sep. 23, 1987

Related U.S. Application Data

[63] Continuation-in-part of Ser. No. 866,852, May 23, 1986, abandoned, which is a continuation-in-part of Ser. No. 740,451, Jun. 3, 1985, abandoned.

[51] Int. Cl.$^4$ .......................... C08G 8/02; C08G 10/00
[52] U.S. Cl. .................................. 528/220; 528/222; 528/224; 528/226; 528/228; 528/229
[58] Field of Search .............. 528/220, 222, 224, 226, 528/228, 229

[56] References Cited

U.S. PATENT DOCUMENTS

| | | | |
|---|---|---|---|
| 3,852,244 | 12/1974 | Heath et al. | 528/226 X |
| 3,928,295 | 12/1975 | Rose | 528/226 |
| 4,396,755 | 8/1983 | Rose | 528/126 |
| 4,398,020 | 8/1983 | Rose | 528/207 |

*Primary Examiner*—Lucille M. Phynes
*Attorney, Agent, or Firm*—A. Cooper Ancona

[57] ABSTRACT

A new process for making polyketones which comprises reacting a diacylaromatic compound with a bis(-trichloromethylketone) compound in the presence of a basic catalyst. New poly-$\beta$-diketones have been prepared using the process.

26 Claims, No Drawings

METHOD FOR MAKING POLYKETONES

CROSS-REFERENCE TO RELATED APPLICATION

This application is a continuation-in-part of abandoned application Ser. No. 866,852, filed May 23, 1986, which is a continuation-in-part of application Ser. No. 740,451 filed June 3, 1985, now abandoned.

BACKGROUND OF THE INVENTION

Aromatic polymers containing ketone linkages are known to the art and are said to be useful for preparing tough, resistant films. A British Pat. No. 971,227, describes an aromatic polymer made by the self-condensation of 4-phenoxybenzoyl chloride in the presence of aluminum chloride and methylene chloride. Other British patents describing polyketones and methods of making them are Br. No. 1,016,245, in which a copolymer containing both sulfone and ketone linkages is produced by reacting 4-phenoxybenzoyl chloride and 4-phenoxybenzenesulphonyl chloride; Br. No. 1,177,183 describes the self-condensation of the potassium salt of 4-(4-fluorobenzoyl)phenol in 1,1-dioxothiolan (sulfolan) and Br. No. 1,153,527 describes copolymers containing sulfone and ketone linkages made by condensing the alkali metal salts of 4-(4-halobenzoyl)phenol and 4-(4-halophenylsulphonyl)phenol. The self-condensation of bis[4'-(4-chlorobenzoyl)biphenylyl]carbonate is described in U.S. Pat. No. 3,764,583. All of the above polymers contain ether linkages between the aromatic rings in addition to the ketone and sulfone links. In U.S. Pat. No. 4,010,147 polyketones containing 1,4-phenylene, ether and ketone linkages (optionally 4,4'-biphenylene, terphenylene or sulphone linkages) are made by reacting a monomer mixture of a di(alkali metal)salt of a bisphenol containing ketone linkages between the aromatic groups and a dihalo aromatic compound having the same linkages. Tough films are said to be formed by compression molding the polymers.

Polymers containing the linkages indicated above are discussed in journal articles. One entitled "Polyaromatic Ether-Ketones from o,o'-Disubstituted Diphenyl Ethers" by J. Lee and C. S. Marvel is found in J. Polym. Science: Polymer Chemistry Edition, Vol. 21, 2189–2195 (1983). Another, describing the properties and uses of such polymers is found in Chemical Engineering Progress, January, 1985, pp. 36–38.

Polyketones are made by the process of this invention by reacting a bis(trichloracetyl)aromatic compound with a bis(acyl)aromatic compound to form a polyketone. The polyketones made in this way are poly-$\beta$-diketones, polymers not heretofore made, and, thus, new compounds. No reference to such polymers has been found in the literature.

SUMMARY OF THE INVENTION

New compounds which are poly-$\beta$-diketones are made by the process which comprises reacting a diacylaromatic compound with a bis(trichloromethylketone) compound in the presence of a basic catalyst.

DETAILED DESCRIPTION OF THE INVENTION

The method for making the new polyketones employs non-corrosive, non-water-sensitive bis(trichloromethylketones) and diacylaromatic compounds. This eliminates the problems associated with acid chlorides, which are water sensitive and generate HCl as a by-product, or fluoroaromatic compounds which are expensive and usually toxic. The by-product chloroform is non-corrosive and easily removed from the product and causes no reduction in molcular weight of the product.

To make polyketones the bis(trichloromethylketone)aromatic compound is reacted with a bis(acyl)aromatic compound as shown by the following equation:

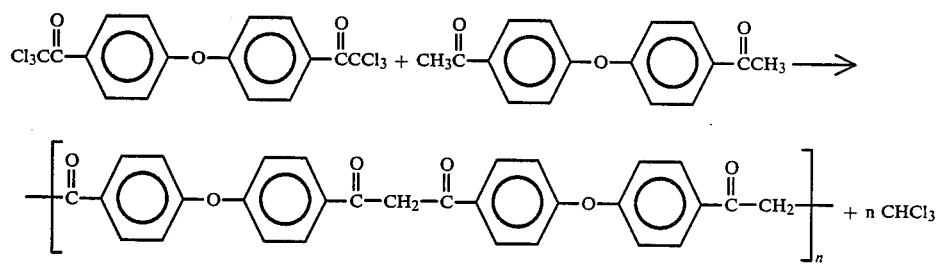

The reactants, in any case, are mixed together, with adequate stirring, in a suitable vessel, either neat as a melt or in a solvent. A catalyst is added, then the mixture is warmed to the desired reaction temperature. The product is precipitated, washed with water, and isolated by filtration.

The aromatic bis(trichloromethylketones) useful in the polymerization reaction have the formula:

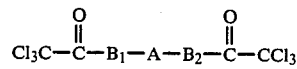

wherein $B_1$ and $B_2$ are independently selected from

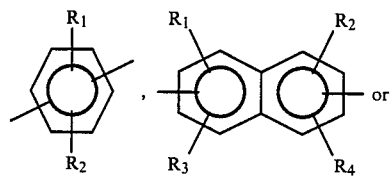

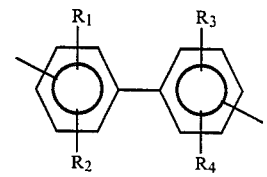

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl group having the formula

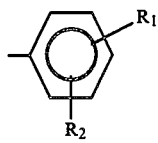

wherein $R_1$ and $R_2$ have the aforesaid meaning and A is a single valence bond, oxygen, sulfur, —CH$_2$—CH$_2$—,

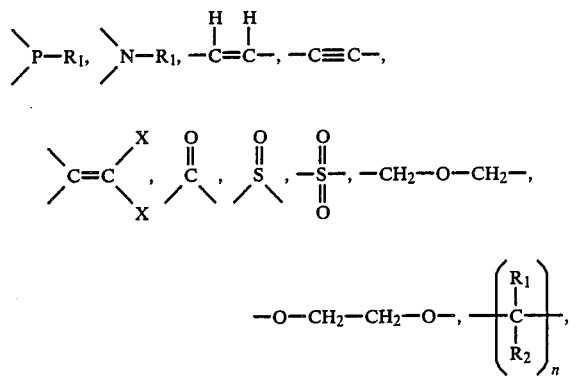

an aromatic group having the formula

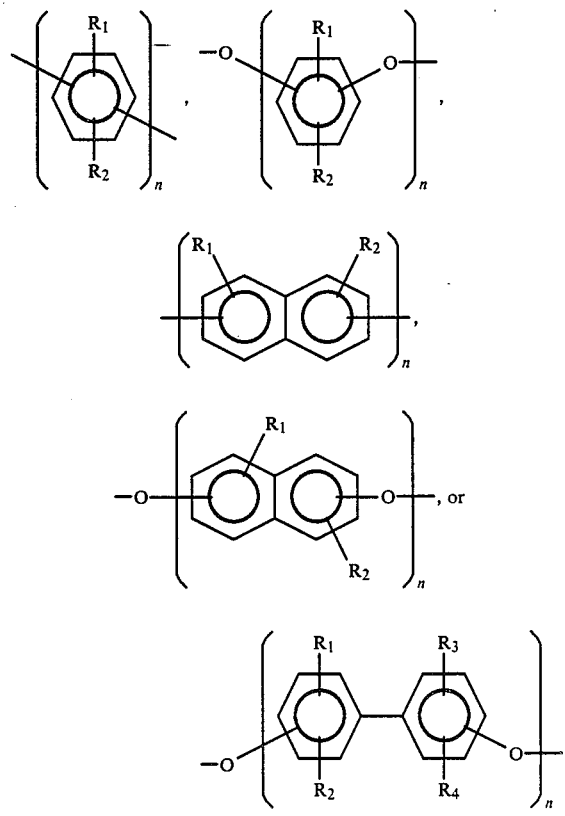

wherein X is chlorine or bromine and $R_1$, $R_2$, $R_3$ and $R_4$ have the aforesaid meanings and n is an integer from 1 to 6.

Representative of the bis(trichloromethylketones) are 4,4'-bis(trichloroacetyl)phenyl ether, 1,4-bis(trichloroacetylphenoxy)benzene, bis(trichloroacetyl)biphenyl, bis(trichloroacetyl)phenoxybiphenyl, 4,4'-bis(trichloroacetyl)3-methyldiphenylether), 4,4'-bis(trichloroacetyl)diphenylmethane, 1,1-bis(4,4-[(trichloroacetyl)phenoxy]phenyl)-2,2,2-trichloroethane, 4,4'-[bis4-(trichloroacetyl)phenoxy]diphenylmethane.

The bis(acyl)aromatic compounds useful in the polymerization reaction have the formula:

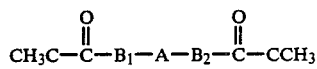

wherein A, $B_1$ and $B_2$ have the same meaning as the same letter designations employed in the formula for the aromatic bis(trichloromethylketones) above.

Representative bis(acyl)aromatic compounds used to form the polyketones are the diacetylbenzenes (o-, m- or p-), 4,4'-bis(acetyl)phenyl ether, 1,4-bis(acetyl)phenoxybenzene, bis(acetyl)phenoxybiphenyls, 4,4'-diacetylbiphenyl, 4,4'-bis(acetyl)diphenylmethane, 4,4'-bis(acetyl)diphenyl-2,2-propane and 4,4'-bis(acetyl)3-methyldiphenyl ether.

The reaction to make the polyketones is generally conducted in the presence of a basic catalyst. The reaction can be conducted in a melt of the reactants, but a polar aprotic solvent is frequently used to advantage.

Representative of the solvents useful in the reaction include tetrahydrofuran (THF), sulfolane, γ-butyrolactone, dimethylsulfoxide (DMSO), dimethylacetamide, dimethylformamide (DMF), hexamethylphosphoramide (HMPA) and N-methylpyrrolidone.

The catalysts useful in the reaction are basic catalysts. Alkali metal hydrides and alkoxides, e.g. NaH and KOC(CH$_3$)$_3$, can be employed as well as tertiary amines, such as trialkyl amines, e.g. triethyl amine. Other tertiary amines which are useful catalysts include 1,4-diazobicyclo[2.2.2]octane, 1,5-diazobicyclo[4.3.0]non-5-ene and N,N-dimethylaminopyridine. Lithium alkyls and amides, e.g. butyl lithium and diisopropyl lithium amide, are also good catalysts for the reaction.

The reaction may be conducted over a broad temperature range from about −100° C. to about +200° C., preferably from about −45° C. to about +85° C. One of the advantages of this process is the low temperature at which it may be conducted, thus avoiding decomposition which can occur at higher temperatures.

Another advantage is the time needed for the reaction to take place which will vary with the temperature, the reactivity of the particular trichloromethylketones employed and the catalyst used, but it is generally accomplished in from about 1 minute to 24 hours and preferably from about 6 minutes to about 12 hours. The reaction is normally very rapid at room temperatures and requires less than an hour, usually only a few minutes.

Temperatures and times outside these ranges generally result in little or no reaction or poor yields due to incomplete reaction or decomposition of the products.

Pressures within the range of from about 20 to 760 mm Hg may be employed. Higher pressure can be employed, but is of no particular advantage. The pressure employed is not a critical variable.

The molecular weights of the polymers normally prepared according to the method of the present invention may vary from about 1,000 to about 10,000,000 depending primarily upon the ratios and purity of the reactants. When one employs stoichiometric amounts of the bis(trichloroacetyl)aromatic compound and the bis(acyl)aromatic compound and the reactants are very pure, one can obtain very high molecular weights. The lower molecular weights normally desired are obtained when an excess of one reactant over the other is employed. The very high molcular weight polymers are insoluble in most solvents.

The poly-$\beta$-diketones made by the present process have the following formula:

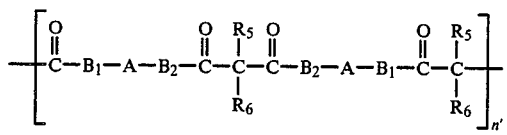

wherein A, $B_1$ and $B_2$ have the previously assigned meanings and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000.

Copolymers prepared by reacting bis(trichloroacyl)aromatic compounds with monomers in which the benzene ring contains two acyl groups will have the following formula:

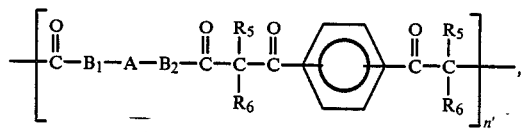

wherein A, $B_1$, $B_2$, $R_5$, $R_6$ and n' have the aforesaid meanings.

The reaction disclosed herein can also be used to prepare homopolymers if the monomer used contains a trichloroacyl group and an acyl group in the same molcule. The formula for such monomers useful in making the homopolymers would appear thus:

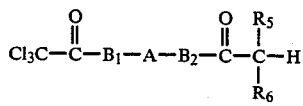

wherein A, $B_1$ and $B_2$ have the meaning previously described and $R_5$ and $R_6$ are independently selected from hydrogen, fluorine, chlorine, bromine, alkyl groups having from 1 to 6 carbon atoms, which may be straight chain or branched, or phenyl.

Another formula for compounds not covered by the above from which homopolymers can be made is

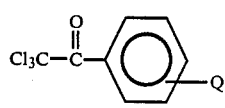

wherein Q is an acyl group which may be ortho-, meta- or para- to the trichloroacetyl group. Compounds covered by the above formula include trichloroacetyl acylbenzenes, wherein the acyl group is

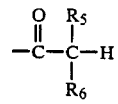

A homopolymer containing the $\beta$-diketone linkage made from a trihaloacyl acyl benzene will have the formula:

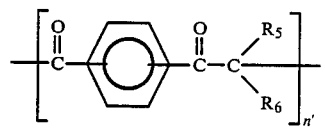

wherein $R_5$ and $R_6$ have the aforesaid meaning.

It should be noted that, in order for reaction to occur with the trihaloacetyl group, the carbon $\alpha$ to the carbonyl group must contain a hydrogen atom.

In another aspect of the invention a compound containing three or more of any of the functional groups can be employed in small amounts along with the other reactants to form crosslinked polymers. Thus, tri(trichloroacetyl)benzene, triacylbenzene and the like can be used to obtain crosslinked polymers according to the invention.

The following example shows the preparation of a poly-$\beta$-diketone by reacting a bis(trichloroacetyl)aromatic compound with a bis(acetyl)aromatic compound.

EXAMPLE 1

Polymerization of 4,4'-bis(trichloroacetyl)phenyl ether with 4,4'-bis(acetyl)phenyl ether In a 250 mL flask under $N_2$, diisopropylamine (0.044 mol, 4.45 g) was dissolved in 100 mL THF and the solution cooled to $-70°$ C. in a dry ice/acetone bath. While holding the temperature of the mixture below $-50°$ C., n-butyllithium (0.044 mol, 2.81 g, 1.6M in hexane) was added via syringe. Then 4,4'-bis(acetyl)phenyl ether (0.020 mol, 5.09 g) in 20 mL THF was added dropwise to this mixture with stirring while allowing the temperature to rise to $-30°$ C. After stirring for 30 minutes at $-30°$ C., 4,4'-bis(trichloroacetyl)phenyl ether (0.020 mol, 9.22 g) in 20 mL THF was added via syringe. When the addition was complete the mixture was allowed to stir and warm to room temperature overnight, then poured into 500 mL of 0.01N HCl, the precipitate collected on a filter and washed with water (300 mL) and acetone (300 mL). The polymer was compression molded at 255° C./5000 psi and had a Tg=179° C. and Tm=323° C. by DSC.

EXAMPLE 2

Polymerization of 4,4'bis(trichloracetyl)phenyl ether with 4,4'-diacetylbiphenyl Into a 1-liter resin flask under $N_2$, was weighed potassium t-butoxide (0.44 mols, 49.38 g) and 250 mL of diglyme (2-methoxyethyl ether) was added with stirring. To this was then added 4,4'-diacetylbiphenyl (0.20 mol, 47.66 g) dissolved in 125 mL diglyme and the mixture stirred for 30 minutes at 35° C. Then 4,4'-bis(trichloracetyl)phenyl ether (0.20 mol, 92.18 g) dissolved in 125 mL diglyme was added to the mixture. The color of the reaction changed at once from white to red and the reaction exothermed to 79° C. The mixture was then heated to 150° C. while removing t-butanol and chloroform, cooled to 80° C. and quenched with acetic acid (60 g, 1.0 mol). The mixture was then poured into 1000 mL of water with stirring and the polymer collected on a filter paper. After drying in a vacuum oven at 150° C./5 mm, 89.4 g (97%) of a golden powder was obtained. Analysis by DSC showed the polymer to have a $T_g$ of 244.8° C.

EXAMPLE 3

Polymerization of 4,4'-bis(trichloroacetyl)phenyl ether with 1,3-diacetylbenzene In the manner of Example 2, potassium t-butoxide (0.44 mol, 49.38 g) 1,3-diacetylbenzene (0.20 mol, 32.44 g) and 4,4'-bis(trichloroacetyl)phenyl ether (0.20 mol, 92.18 g) were allowed to react in 500 mL diglyme to produce, after workup, 69.95 g (91%) of a golden powder. Analysis by DSC gave a $T_g$ of 193.5° C.

EXAMPLE 4

Polymerization of 1,4-bis(trichloroacetyl)benzene with 1,4-diacetylbenzene

In the manner of Example 2, potassium t-butoxide (0.22 mol, 24.7 g) 1,4-diacetylbenzene (0.10 mol, 16.22 g) and 1,4-bis(trichloracetyl)benzene (0.10 mol, 36.62 g) were allowed to react in 500 mL diglyme. The reaction, after workup, gave 27.92 g (96%) of a pale yellow powder, the desired polymer. Analysis by DSC gave a $T_g$ of 222.7° C.

I claim:

1. A process for making polyketones by reacting (a) an organic compound containing at least one trichloromethylketone group with (b) an organic compound containing at least one acyl group and wherein the reactant molecules each contain at least two of said reactive functional groups.

2. The process of claim 1 wherein both the trichloromethylketone and the acyl functional groups are in the same molecule.

3. The process of claim 1 wherein a bis(trichloromethylketone) compound is reacted with an organic compound containing two reactive acyl groups.

4. The process of claim 1 wherein (a) is a bis(trichloromethylketone) having the formula:

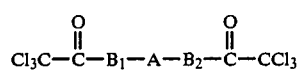

wherein $B_1$ and $B_2$ are independently selected from

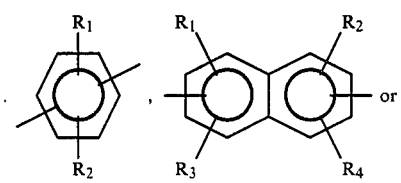

-continued

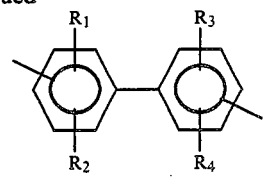

and which may be the same or different, and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl group having the formula

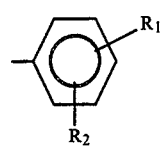

wherein $R_1$ and $R_2$ have the aforesaid meaning, and A is a single valence bond, oxygen, sulfur, —CH$_2$—CH$_2$—,

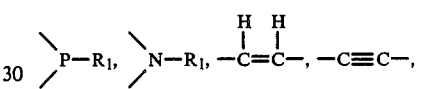

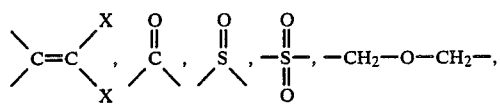

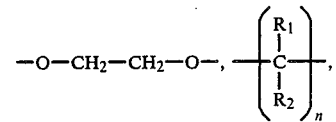

an aromatic group having the formula

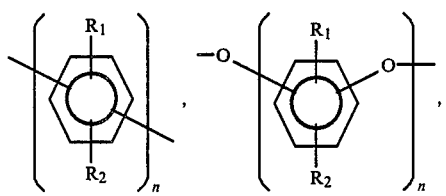

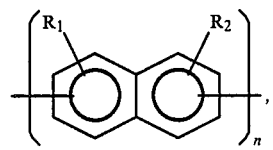

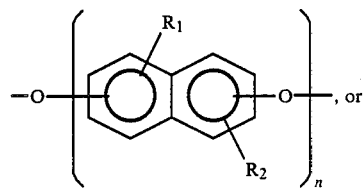

, or

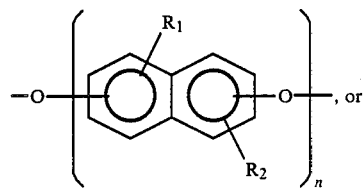

-continued

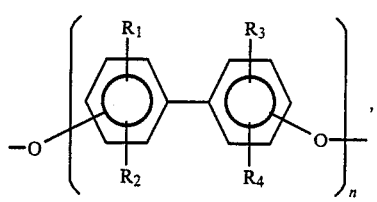

wherein X is chlorine or bromine and $R_1$, $R_2$, $R_3$ and $R_4$ having the aforesaid meanings and n is an integer from 1 to 6.

5. The process of claim 4 wherein the (b) compound has the formula

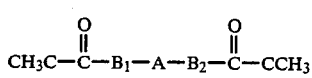

wherein A, $B_1$ and $B_2$ have the aforesaid meaning.

6. The process of claim 4 wherein the reaction is conducted in a solvent.

7. The process of claim 4 wherein the (a) reactant is 4,4'-bis(trichloroacetyl)phenyl ether or 1,4-bis(trichloroacetyl)benzene and the (b) reactant is diacetyl benzene, 4,4'-bis(acetyl)phenyl ether, 1,4-bis(acetylphenoxy)benzene, bis(acetyl)phenoxybiphenyl, 4,4'-bis-(acetyl)diphenylmethane, 4,4'-bis(acetyl)diphenyl-2,2-propane, 4,4'-bis(acetyl)3-methyldiphenyl ether, 4,4-bis-(acetyl)benzophenone or 4,4'-diacetylbiphenyl.

8. The process of claim 5 wherein the reaction is conducted in the presence of a catalyst.

9. The process of claim 8 wherein the reaction is conducted in the presence of a basic catalyst.

10. The process of claim 6 wherein the solvent is a polar aprotic solvent.

11. The process of claim 10 wherein the solvent is tetrahydrofuran, sulfolane, γ-butyrolactone, dimethylsulfoxide, dimethylformamide, dimethylacetamide, N-methylpyrrolidone or 2-methoxyethyl ether.

12. The process of claim 5 wherein the reaction is conducted at a temperature of from about −100° to about +200° C.

13. The process of claim 12 wherein the reaction is conducted at a temperature of from about −45° to about +85° C.

14. The process of claim 5 wherein the reaction is conducted at subatmospheric pressure.

15. The process of claim 14 wherein the pressure is at least about 20 mm Hg.

16. The process of claim 9 wherein the basic catalyst is an alkali or alkaline earth metal hydride or alkoxide, a tertiary alkyl amine or an alkali metal alkyl or amide.

17. A poly-β-diketone having the formula

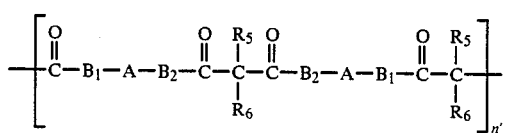

wherein $B_1$ and $B_2$ are independently selected from

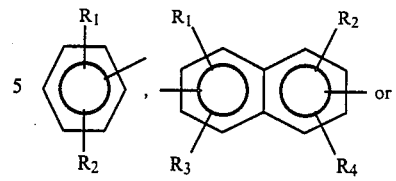

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl group having the formula

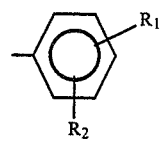

wherein $R_1$ and $R_2$ have the aforesaid meaning, and A is a single valence bond, oxygen, sulfur, —CH$_2$—CH$_2$—,

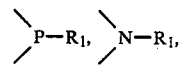

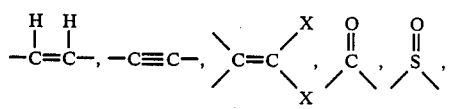

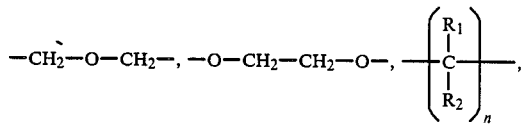

or an aromatic group having the formula

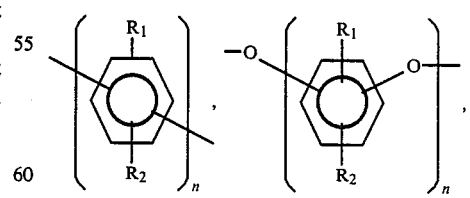

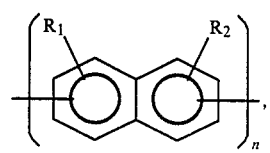

-continued

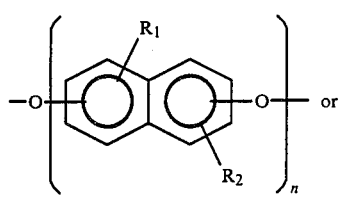
or

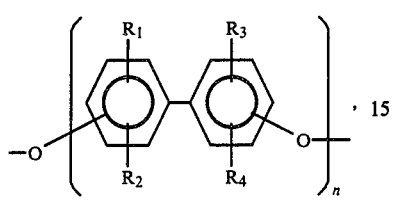

wherein X is chlorine or bromine and $R_1$, $R_2$, $R_3$ and $R_4$ have the aforesaid meanings, and wherein n is an integer from 1 to 6, and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000.

18. The poly-$\beta$-diketone of claim 17 wherein A is oxygen and $B_1$ and $B_2$ each have the formula

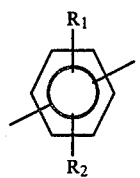

wherein $R_1$ and $R_2$ are independently selected from the group consisting of hydrogen, chlorine, bromine, an alkyl or an alkoxy group having from 1 to 4 carbon atoms, a phenyl group or substituted phenyl group having the formula

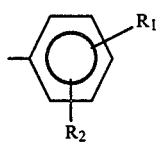

wherein $R_1$ and $R_2$ have the aforesaid meaning.

19. The poly-$\beta$-diketone of claim 17 wherein $R_1$ and $R_2$ are each hydrogen.

20. A polymer containing the $\beta$-diketone linkage having the formula

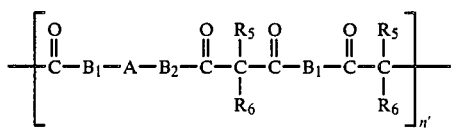

wherein $B_1$ and $B_2$ are independently selected from

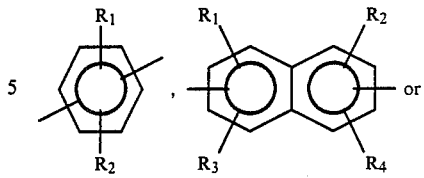

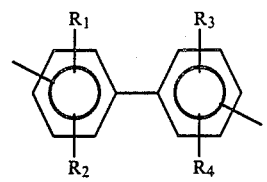

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl group having the formula

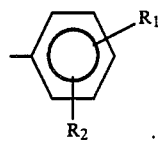

wherein $R_1$ and $R_2$ have the aforesaid meaning, and A is a single valence bond, oxygen, sulfur, —CH$_2$—CH$_2$—,

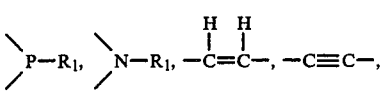

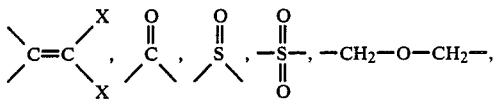

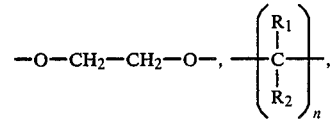

an aromatic group having the formula

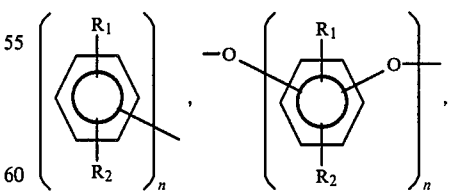

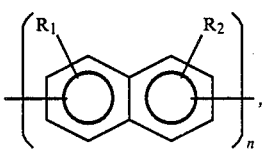

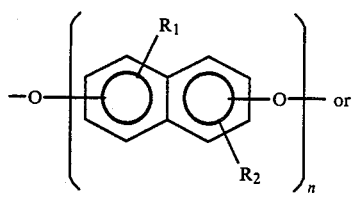

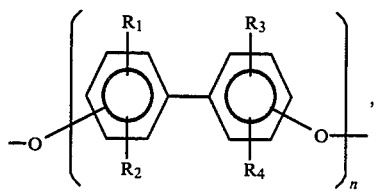

wherein X is chlorine or bromine and $R_1$, $R_2$, $R_3$ and $R_4$ have the aforesaid meanings, and wherein n is an integer from 1 to 6, and wherein $R_5$ and $R_6$ are independently selected from hydrogen, fluorine, chlorine, bromine, alkyl groups having from 1 to 6 carbon atoms, which may be straight chain or branched, or phenyl, and wherein n' is an integer from 10 to about 5000.

21. A poly-$\beta$-diketone of claim 20 wherein A is oxygen and $B_1$ and $B_2$ each have the formula

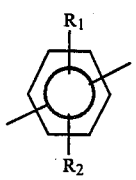

wherein $R_1$, $R_2$ are independently selected from the group consisting of hydrogen, chlorine, bromine, an alkyl or an alkoxy group having from 1 to 4 carbon atoms, a phenyl group or substituted phenyl group having the formula

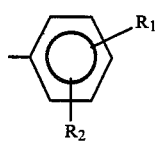

wherein $R_1$ and $R_2$ have the aforesaid meaning.

22. A poly-$\beta$-diketone of claim 21 wherein $R_1$ and $R_2$ are each hydrogen.

23. A poly-$\beta$-diketone of claim 17 wherein A is a single valence bond and $B_1$ and $B_2$ are independently selected from

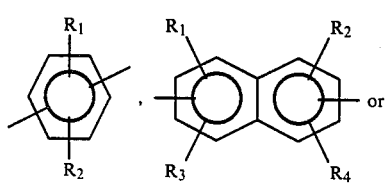

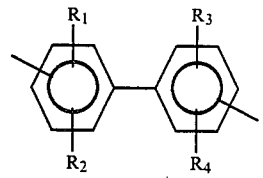

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl group having the formula

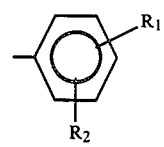

wherein $R_1$ and $R_2$ have the aforesaid meaning.

24. A polymer containing the $\beta$-diketone linkage having the formula

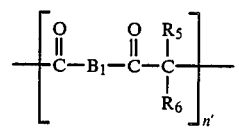

wherein $B_1$ is independently selected from

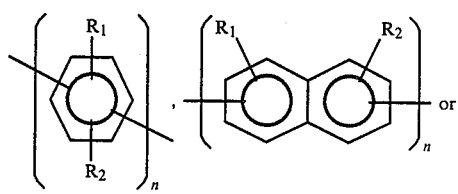

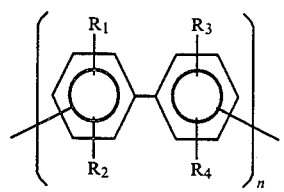

and which may be the same or different and wherein $R_1$, $R_2$, $R_3$ and $R_4$ are independently selected from the group consisting of hydrogen, chlorine, bromine, an alkyl or an alkoxy group having from 1 to 4 carbon atoms, a phenyl group or substituted phenyl group having the formula

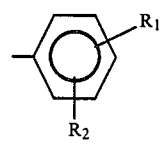

wherein $R_1$ and $R_2$ have the aforesaid meaning.

25. The composition of claim 23 wherein B₁ is
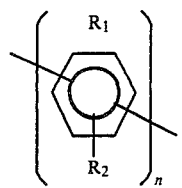
and n is 1.
26. The composition of claim 25 wherein $R_1$ and $R_2$ are each hydrogen.
* * * * *